July 13, 1965

T. L. GREENWOOD 3,194,060

SEISMIC DISPLACEMENT TRANSDUCER

Filed Jan. 30, 1962

THOMAS L. GREENWOOD
INVENTOR.

BY

ATTORNEYS

July 13, 1965  T. L. GREENWOOD  3,194,060
SEISMIC DISPLACEMENT TRANSDUCER
Filed Jan. 30, 1962  5 Sheets-Sheet 2

THOMAS L. GREENWOOD
*INVENTOR.*

BY

*ATTORNEYS*

July 13, 1965     T. L. GREENWOOD     3,194,060
SEISMIC DISPLACEMENT TRANSDUCER
Filed Jan. 30, 1962     5 Sheets-Sheet 4

THOMAS L. GREENWOOD
INVENTOR.

BY

ATTORNEYS

July 13, 1965 T. L. GREENWOOD 3,194,060
SEISMIC DISPLACEMENT TRANSDUCER
Filed Jan. 30, 1962 5 Sheets-Sheet 5

THOMAS L. GREENWOOD
INVENTOR.

BY
ATTORNEYS

United States Patent Office 3,194,060
Patented July 13, 1965

3,194,060
SEISMIC DISPLACEMENT TRANSDUCER
Thomas L. Greenwood, Huntsville, Ala., assignor to the United States of America as represented by the Administrator of the National Aeronautics and Space Administration
Filed Jan. 30, 1962, Ser. No. 169,977
1 Claim. (Cl. 73—71.2)
(Granted under Title 35, U.S. Code (1952), sec. 266)

The invention described herein may be manufactured and used by or for the Government of the United States of America for governmental purposes without the payment of any royalties thereon or therefor.

This invention relates to a vibration measuring device, and more particularly to such a device for measuring low frequencies of moderate to large magnitude which may be induced in buildings or other structures by either natural or artificial forces.

More particularly, the invention relates to means to measure the swaying of buildings and other structures where no fixed reference point is available, and where the lower end of the frequency range is below one cycle per second.

The known available devices of the prior art were not considered to be feasible or practical for such employment. As one example of such prior art devices, accelerometers were found to be impractical for this application because of the low acceleration ranges being used. For example, at the frequency with which the measurements desired are concerned, that is, approximately one cycle per second, a sine wave of ±.25 inch peak displacement obtained on an accelerometer would have an acceleration of .0125 G. This measurement value would then have to be integrated twice to derive the actual displacement. In view of the relatively complex waves commonly encountered in the vibrations with which we are here concerned, this determination by means of an accelerometer would be quite difficult to attain.

As another example, standard seismographic instruments were also found to be impractical since they produce an output proportional to velocity. Thus this measurement also would have to be integrated to derive displacement, thereby rendering standard seismographic instruments and their systems impractical.

Thus, from the above investigation, the most easily usable and most practical device would be a suspended damped pendulum wherein the relative displacement between the suspended mass and the structure could be measured directly. However, a conventionally damped pendulum with this characteristic would, of necessity, be impractically long (in the order of 40 inches). A means for shortening this pendulum length was therefore mandatory to make such a device practical, and resulted in the novel and practical construction of the present invention.

In general, the invention comprises a support means having thereon a pendulum which is free to move in two directions, i.e. back and forth in a plane at right angles to the support means. The pendulum is pivoted on an essentially frictionless pivot point and has attached thereto an unbalancing or astaticizing spring acting directly across the pivot point, thus permitting the desired low-frequency oscillation with a relatively short pendulum and minimum overall dimensions.

The following specification will clearly set out the presently preferred construction and operation of the invention when taken in conjunction with the drawings in which.

Generally, seismic type transducers consist basically of a mass suspended by springs within a supporting framework, and usually include a means for damping the relative motion between the mass and the frame. The operation of such a system is based on the "single degree of freedom" equation.

$$\frac{Y}{X} = \frac{\left(\frac{F}{F_n}\right)^2}{\sqrt{\left[1-\left(\frac{F}{F_n}\right)^2\right]^2+\left(2h\frac{F}{F_n}\right)^2}}$$

where:

$X$=peak forced displacement of the framework relative to a fixed reference point;
$Y$=peak displacement of the mass relative to a fixed point on the framework;
$F$=the exciting frequency;
$F_n$=the natural frequency; and
$h$=the damping factor.

Figure 1:
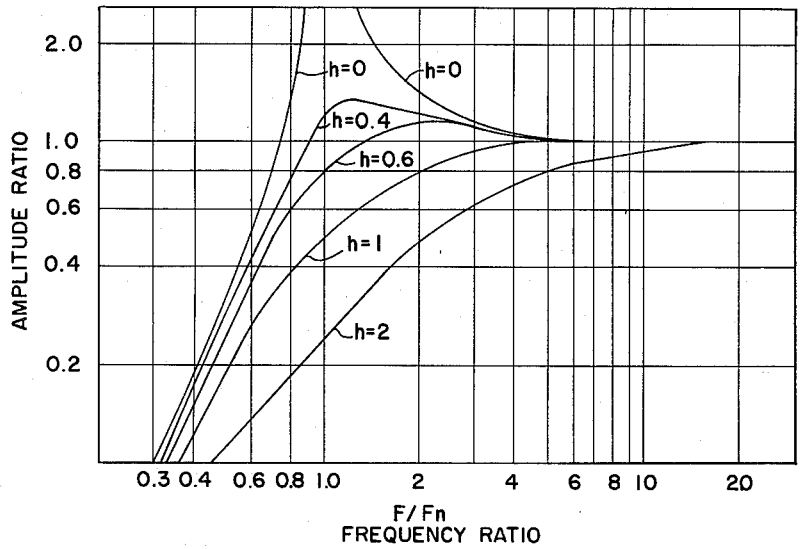
FIGURE 1 is a general graph of frequency response plotted against damping factors.

FIGURE 1 illustrates graphically the effect of given damping factors in relation to relative frequency response. When the frequency of forced motion (F) is much greater than the natural frequency ($F_n$) of the suspended system, the relative motion between the mass and the framework becomes the same as the forced motion. The inertia of the suspended mass of the system causes it to remain motionless while the framework moves with respect to it. For a damping ratio of 0.6 of critical (an instrument is critically damped when the deflected suspended system approaches its final zero position at the greatest possible rate without going beyond), the ratio of exciting frequency to natural frequency ($F/F_n$) can be as low as two before the relative motion between the mass and the framework begins to differ materially from the framework motion (see graph, FIGURE 1, $h$=0.6). For a properly damped system, the relative displacement between the suspended mass and the framework is a faithful reproduction of the forced displacement of the framework above approximately two times the natural frequency. Thus, for a system to have a good frequency range from one cycle per second up, the natural frequency should be 0.5 cycle per second or less.

Figure 2:
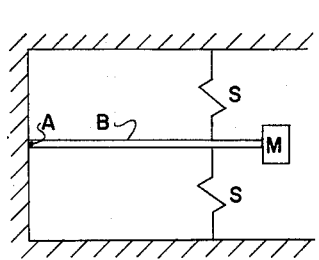
FIGURE 2 is a schematic illustration of a simple mass and spring system.
Figure 3:
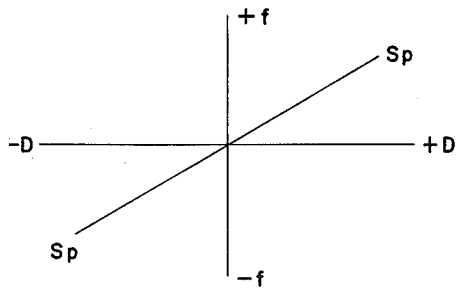
FIGURE 3 is a graphic representation of the displacement-restoring force relation of the system of FIGURE 2.

A simple mass and spring oscillatory system is shown schematically in FIGURE 2. A thin bar B pivoted at one end A has a mass M attached at the free end thereof. Springs S restrain it to rest at the neutral position. FIGURE 3 shows diagrammatically the relation between displacement D and restoring force ($f$) where $S_p$ equals the normal spring force. The frequency of oscillation of such a system is proportional to the restoring force and inversely proportional to the mass and its distance from the pivot point A. To reduce the natural frequency $F_n$, either the restoring force $f$ must be reduced, or the mass M or length of bar B must be increased.

Figure 4:
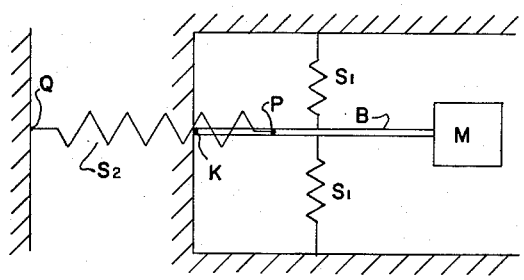
FIGURE 4 is a schematic representation of the astaticizing principle employed in the present invention.

In distinction to the system illustrated in FIGURES 2 and 3 and the requirements necessary to reduce the natural frequency thereof, an astaticizing principle may be utilized. This is schematically illustrated in FIGURE 4. In this instance, the bar B is pivoted at point K and has springs $S_1$ restraining it to rest at a neutral position. Mass M is attached to the free end of bar B as previously described. However, here a spring $S_2$ exerts a spring force between a point P on the bar and a point Q on a fixed base, so that the force of spring $S_2$ acts directly across the pivot point when the mass is in a neutral or rest position.

Figure 5:
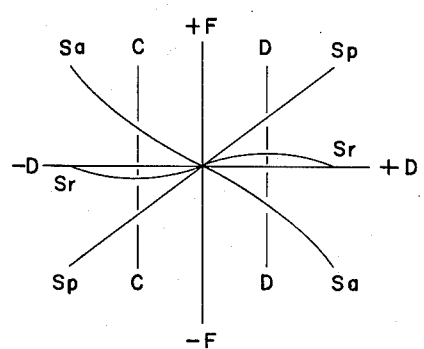
FIGURE 5 is a graphic representation of the displacement-restoring force of the system shown in FIGURE 4.

Thus it is seen that when the above described type of system is balanced so that the bar-mass M is at a neutral or rest position, the spring force of spring $S_2$ between points P and Q has no effect. However, when the system is unbalanced, the relation between the various forces is as shown in FIGURE 5. The normal spring force $S_p$ resulting from springs $S_1$ is partially neutralized by the spring force $S_a$ resulting from spring $S_2$, spring $S_2$ thus acting as an astaticizing spring. As is evident from an inspection of FIGURE 5, the resultant spring force $S_r$ is considerably less than $S_p$. As seen, it goes to zero at large displacements. This would, of course, result in a nonlinear relation between force and displacement. Therefore, proper adjustment requires something less than the total neutralization of $S_p$, so the displacement is limited to C and D. Under the conditions illustrated, good linearity is obtained if the distance K–Q is twice the distance P–K, as shown in FIGURE 4.

Figure 6:
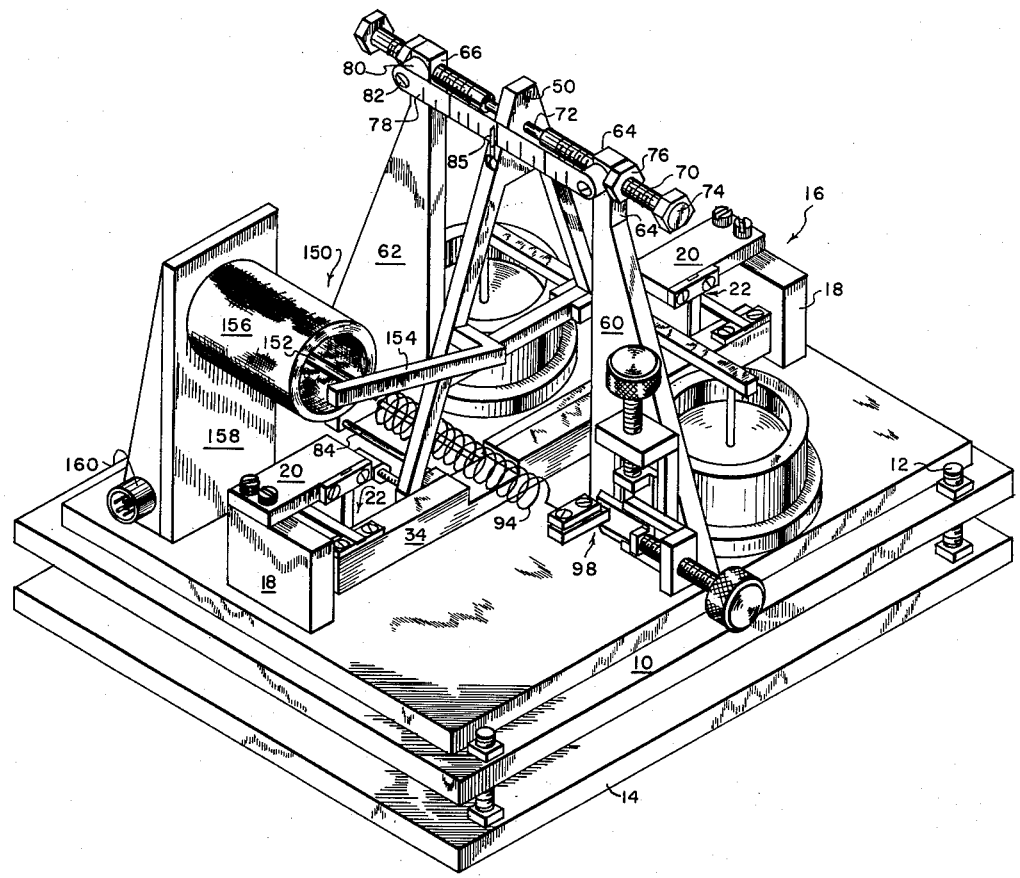
FIGURE 6 is a perspective view of the device of the invention in its preferred form.
Figure 7:
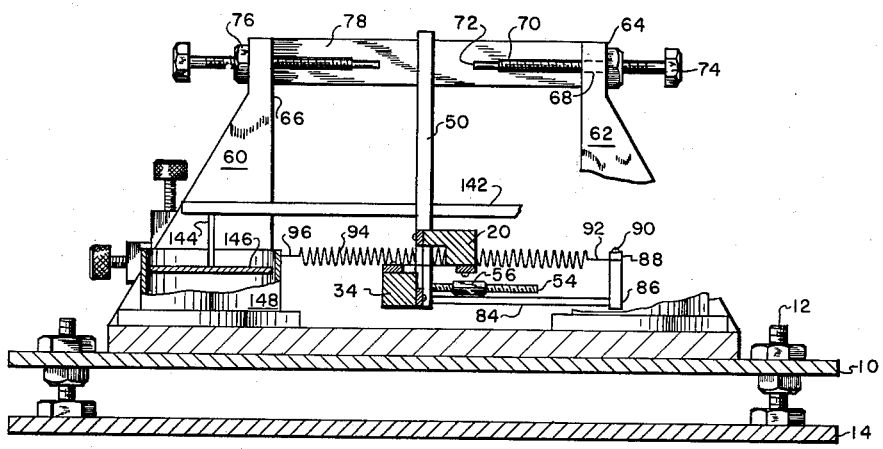
FIGURE 7 is a sectional view in elevation of the device of FIGURE 6.

The device of the present invention is designed in accordance with the above principles, and a specific embodiment thereof is shown in perspective in FIGURE 6, and in FIGURE 7 in section. Referring first to FIGURE 6, the device comprises a base member 10 having leveling screws 12 adjustably attaching base 10 to sub-base member 14. Supported on base 10 are a pair of spaced pivot arm support elements 16 each comprising support element 18 and suspension element 20. Suspension element 20 comprises a frictionless cross-flexure spring pivot assembly which is generally indicated by the reference numeral 22 in FIGURE 6, the details of which are best shown in FIGURE 8.

Figures 8, 9:
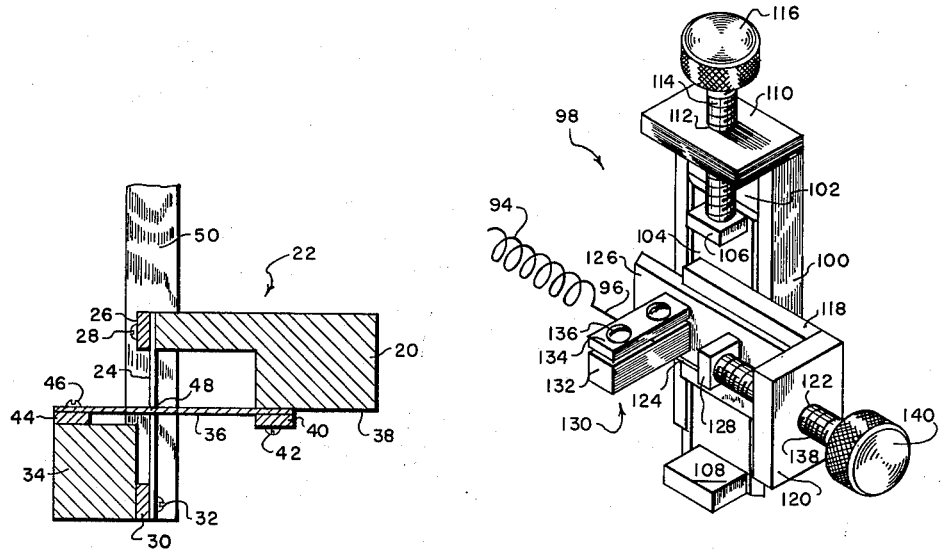
FIGURE 8 is an enlarged sectional view in elevation of the pivot employed.
FIGURE 9 is a detail perspective view of the adjustment means for the astaticizing spring.

As indicated in FIGURE 8, each pivot assembly 22 comprises a suspension element 20 to which is attached vertical flexure spring 24 by means of spring retaining element 26 and clamping screws 28. The lower end of spring 24 is secured by a spring retaining element 30 and screws 32 to the side of pendulum base extension 34. Suspension element 20 also carries horizontal flexure spring 36 attached to its lower face 38 by spring retaining member 40 and screws 42. The opposite end of flexure spring 36 is secured to pendulum base extension 34 by means of retaining member 44 and screw 46. Thus, a pivot point 48 is established along the lower portion of pendulum 50.

The suspension points or pivot points 48 provide stability against side forces, and hold the generally "A" or triangularly shaped pendulum 50 in an inverted position. Such positioning has the advantage of utilizing a small astaticizing force resultant from gravity, and in addition provides accessibility for ease of adjustment as more fully explained hereinafter. Balancing screw 54 and weight 56 (FIGURE 7) are attached to the pendulum and permit balancing it in an obvious manner. Positioned on each side of the pendulum and substantially in the center are bracket members 60, 62 attached to base member 10. The bracket members are provided on their free ends with substantially flat, perpendicular faces 64, 66, and with threaded apertures 68 therethrough. Screws 70 are threaded within aperture 68 and have pendulum limit stops 72 on their inside ends and screw turning heads 74 on the opposite ends thereof. Locknuts 76 retain the screws 70 in their desired positions. A visual displacement scale 78 (FIGURE 6) is removably secured to brackets 60, 62 by means of standoff adapters 80 and screws 72. Pointer 85 is secured on the rear leg of pendulum 50 for cooperation with scale 78.

Pendulum 50 has an outwardly extending horizontal arm 84 on the end of which are attached spring clamping or retaining elements 86, 88 and screw 90 (FIGURE 7). Retained by clamping elements 86, 88 is one end 92 of astaticizing spring 94, the other end of spring 94 having an attaching portion 96 thereon which is attached to a screw adjusted crosshead mounted on bracket member 60, the crosshead being generally indicated at 98 in FIGURE 6. The crosshead arrangement is shown in detail in FIGURE 9, and comprises a fixed base member 100 having a slideway 102 lengthwise thereof. Positioned within slideway 102 is a force direction adjusting slide 104, which slide has screw reaction means 106 thereon, and tension assembly reaction plate 108 at the bottom. Base element 100 is provided with a fixed plate 110 having a screw threaded recess 112 therein. A force direction adjustment screw 114 having a knurled head 116 is threaded into recess 112.

Attached to adjustment slide 104 is a tension adjustment base element 118 having fixed plate 120 normal thereto, this plate having a screw receiving threaded recess 122 therein, base element 118 being provided with a slideway 124, which slideway is normal to force direction 102. Tension adjustment slide 126 is provided with screw reaction means 128 and spring clamping assembly 130, which comprises clamp elements 132, 134 and clamp screws 136. Tension adjusting screw 138 having a knurled head 140 is screwed into recess 122 on plate 120 and reacts against means 128.

As seen in FIGURE 7, one leg of the pendulum 50 carries a damping plate suspension member 142 and has at each end a vertical suspension arm 144 having damping pistons or plates 146 extended into air-dashpot 148. Although the pistons 146 move on an arc with the axis of rotation coincident with the pendulum pivot 48, the departure from a straight line is less than the clearance between the piston 146 and the inside surface of dashpot 148, so that there is no binding. These damping means operate in a "push-pull" manner, damping the pendulum motion to about 0.6 of critical. To provide for variable damping, a tube line (not shown) having a simple "stop cock" valve therein, may be provided, intercommunicating the dashpots.

Displacement of the pendulum may be measured by a differential transformer 150 (FIGURE 6) having a core 152 supported by arm 154, which arm is attached to pendulum 50 by any known means. Core 152 is caused to move within coil 156 by displacement of the pendulum 50. Coil 156 may be supported by plate 158 having thereon a quick disconnect socket 160. Any suitable recording oscillograph (not shown) or other recording means may be then simply plugged in at 160. Such a system gives adequate sensitivity to provide full galvanometer deflection with only .05 inch displacement at the top of the pendulum.

To initially set up or adjust the device of FIGURES 6–9, the base is leveled with either a spirit or built-in level, and the pendulum 50 is adjusted to a vertical position by moving the weight 56 on adjusting screw 54. Pointer 84 at the top of pendulum 50 will indicate when the pendulum is centered on scale 78. The maximum displacement is then set by limit screws 70, the astaticizing spring 94 is connected and adjusted by the crosshead assembly 98 so that the pendulum remains at the center position, and tension adjustment screw 138 is adjusted so that the frequency of the pendulum is at the desired value. This may easily be determined by manually displacing the pendulum and determining the time interval required for ten periods. Too much tension will, of course, cause the pendulum to rest against one or the other of the limit stops and fail to return to center position.

The dashpot pistons 146 are next attached, and on manual displacement of the pendulum should return the pendulum to center position with an overshoot of approximately ten percent. The pendulum may then be locked in position by means of the limit screws and transported to any desired location. If the pendulum position is changed so that it is no longer in the center, it may be readily corrected by means of the direction adjustment screw 112, which controls vertical movement of the crosshead. The instrument should of course be protected by a cover (not shown) to prevent disturbance by air currents and contamination by dust or dirt.

Figure 10:
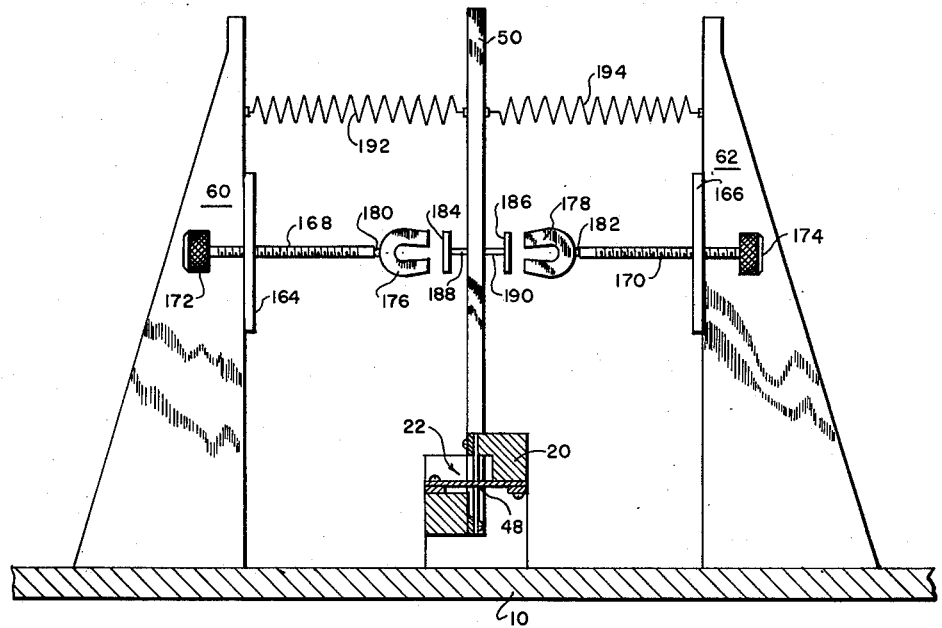
FIGURE 10 is an elevational view, partially in section, of a modification of the device of FIGURE 6.

FIGURE 10 is illustrative of a modification of the device of FIGURE 6 wherein a magnetic astaticizing means is employed in placed of the spring astaticizing means of FIGURE 6. With reference specifically to FIGURE 10, there is shown a displacement indicating means comprising in part, an adjustable base 10 carrying pendulum 50, which pendulum is suspended by a suspension assembly 20 which carries cross-flexure pivot assembly 22, which forms pivot point 48, all as previously described. Bracket members 60, 62 are, in this case, provided with plates 164, 166 extended outwardly therefrom. Each of the plates has a threaded hole (not shown) therethrough, or equivalent means, for reception of screws 168, 170, which have knurled adjusting knobs 172, 174 at the outer ends respectively. On the inner end of each screw is a permanent magnet 176, 178 rotatably mounted at 180, 182. Plates 184, 186 are attached by arms 188, 190 to the pendulum 50, which plates obviously are attracted to the magnets.

Springs 192, 194 are positioned between the pendulum 50 and brackets 60, 62 and provide the restoring force necessary. Thus, the magnets 176, 178 and springs 192, 194 replace the unbalancing spring 94 and crosshead assembly 98 of the FIGURE 6 device. This system is advantageous because it permits a more compact assembly, as well as obviating any change in the unbalancing force, since any spring, such as 94, will have slight changes due to both weather conditions and wear. Since the restoring springs 192, 194 are not the astaticizing means, changes therein are not critical.

This modification, with the magnets 176, 178 inoperative would have a characteristic displacement-restoring force relationship as illustrated in FIGURE 3. However, when the unbalancing means (i.e. the magnets) are employed, movement of the pendulum 50 in one direction will cause a decrease in the plate to magnet distance on that side, thus increasing the unbalancing force, the displacement-restoring force then being as represented by the curve $S_a$ of FIGURE 5, with the resultant, when plotted against the spring restoring force $S_p$, being as represented by $S_r$.

The device of FIGURE 10 is set up in much the same manner as that of FIGURE 6, except that instead of adjusting a spring 94, of the type shown in FIGURE 7, the magnets 176-178 are adjusted to reach the desired balance. It is, of course, obvious that the limiting means, visual scale, damping means, and displacement measuring means as fully illustrated in FIGURE 6, remain the same in this device, and have been omitted for the sake of clarity.

It is thus seen that there has been provided a displacement transducer particularly advantageous for measuring vibrations having a relatively low frequency; i.e. one cycle per second, yet one which is of relatively small size, rugged, easy to operate, and stable.

The particular instrument above described has been found most practical and useful in measuring frequencies induced in static test structures in connection with rocket propulsion tests, although it is obvious that the instrument has particular usefulness wherever such low frequency vibrations are encountered. It is also obvious that the configuration and details of the instrument can be changed without departing from the scope of the invention as defined by the following claim.

What is claimed is:

A seismic displacement transducer for measuring low frequencies induced in building structures, comprising
(A) a base member having
  (1) a sub-base,
  (2) adjustable means spacing said sub-base from said base to permit precise leveling of said base,
(B) a displaceable mass in the form of an inverted pendulum of essentially triangular shape,
(C) means operative to establish a horizontal axis about which said mass may have limited motion, said means comprising
  (1) a pair of pivot arm support elements, each said element comprising a support element base member rigidly attached to said base member, and a suspension element attached and at right angles to said support element base member,
  (2) a pendulum extension attached to one side of said triangular-shaped pendulum at substantially the base thereof,
  (3) leaf spring members forming a cross-flexure support means between each said pivot arm support element and the ends of said pendulum extension,
(D) spring means adjustably attached between said pendulum and said base member thereby permitting said pendulum to be of minimum length, said spring means bisecting and acting across the horizontal axis of said pendulum when said pendulum is at rest,
(E) a crosshead adjusting means secured to said transducer base member and operative to vary the tension exerted by said spring and the direction of force of said spring, said means comprising
  (1) a vertically movable screw adjustment means operatively attached to said spring means and serving to vary the direction of said spring force, and
  (2) a horizontally movable screw adjustment means operatively attached to said vertical screw adjustment means serving to vary the tension exerted by said spring,
(F) means integrally secured to said pendulum and said base and operative to damp the pendulum motion, and
(G) displacement responsive means comprising a differential transformer and means suitable for connecting said displacement responsive means to a recording means.

References Cited by the Examiner

UNITED STATES PATENTS

| | | | |
|---|---|---|---|
| 1,870,344 | 8/32 | Neumann | 73—382 X |
| 2,313,893 | 3/43 | Rushing | 73—71.2 X |
| 2,576,775 | 11/51 | Case | 73—71.2 X |
| 2,636,160 | 4/53 | Loper et al. | 340—17 |
| 2,964,948 | 12/60 | La Coste | 73—382 |

RICHARD C. QUEISSER, *Primary Examiner.*

JOHN P. BEAUCHAMP, *Examiner.*